US005539384A

United States Patent [19]
Frasier

[11] Patent Number: 5,539,384
[45] Date of Patent: Jul. 23, 1996

[54] ELECTRONIC WATER UTILITY SAFETY APPARATUS

[76] Inventor: Berwyn T. Frasier, Rte. 7, Box 43-B, Sparta, Tenn. 38583

[21] Appl. No.: 492,192

[22] Filed: Jun. 19, 1995

[51] Int. Cl.⁶ .................................................. G08B 21/00
[52] U.S. Cl. ...................... 340/605; 340/604; 340/618; 340/626; 137/80; 137/551; 73/40; 73/40.5 R; 73/40.5 A
[58] Field of Search .................................. 340/604, 605, 340/626, 611, 614; 137/551, 557, 403, 414, 79, 80; 73/40, 40.5 R, 40.5 A

[56] References Cited

U.S. PATENT DOCUMENTS

| | | | |
|---|---|---|---|
| 3,846,774 | 11/1974 | Thorbard et al. | 340/611 |
| 4,106,002 | 8/1978 | Hogue, Jr. | 340/626 |
| 4,742,841 | 5/1988 | Vonderhaar et al. | 137/551 |
| 4,845,472 | 7/1989 | Gordon et al. | 340/605 |
| 4,977,923 | 12/1990 | Cho | 137/414 |
| 5,139,044 | 8/1992 | Otten et al. | 137/80 |
| 5,153,564 | 10/1992 | Hoiberg | 340/604 |
| 5,190,069 | 3/1993 | Richards | 340/605 |
| 5,240,022 | 8/1993 | Franklin | 340/605 |
| 5,240,028 | 8/1993 | Hoch, Jr. et al. | 137/80 |
| 5,377,529 | 1/1995 | Boyd | 340/605 |

Primary Examiner—John K. Peng
Assistant Examiner—Van T. Trieu

[57] ABSTRACT

An electronic water utility safety apparatus comprising a control box positionable within the house of a user. A display indicates a sensed water pressure. An indicator is mounted in the box to generate an audible signal upon the pressure being modified from an acceptable range. An electrical line is positioned from the box to a source of potential within the house. A second line is positioned from the box to a water line for the house. A sensor is mounted on the line to determine the pressure within the line and to allow the indicator to display such pressure read. A valve is located within the water line adjacent to the sensor to shut off the flow of water upon the pressure being outside of a predetermined range. An electrical circuit is provided for controlling the box.

1 Claim, 4 Drawing Sheets

ELECTRONIC WATER UTILITY SAFETY APPARATUS

BACKGROUND OF THE INVENTION

1. Field of the Invention

The present invention relates to an electronic water utility safety apparatus and more particularly pertains to terminate the water feed to a house when the pressure thereof varies from a predetermined range.

2. Description of the Prior Art

The use of water control devices of various designs and configurations is known in the prior art. More specifically, water control devices of various designs and configurations heretofore devised and utilized for the purpose of precluding the flow of water through a house when desired parameters are not met through various methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,742,841 to Vonderhaar et al, discloses a water shut-off valve.

U.S. Pat. No. 4,845,472 to Gordon et al., discloses a leak sensing alarm and supply shut-off apparatus.

U.S. Pat. No. 4,977,923 to Cho discloses a pilot-controlled water pressure-operated diaphragm shut-off valve.

U.S. Pat. No. 5,153,564 to Hoiberg discloses a leak damage prevention system.

Lastly, U.S. Pat. No. 5,240,028 to Hoch, Jr., et al., discloses a temperature sensitive water supply shut-off system.

In this respect, the electronic water utility safety apparatus according to the present invention substantially departs from the conventional concepts and designs of the prior art, and in so doing provides an apparatus primarily developed for the purpose of terminating the water feed to a house when the pressure thereof varies from a predetermined range.

Therefore, it can be appreciated that there exists a continuing need for new and improved electronic water utility safety apparatus which can be used for terminating the water feed to a house when the pressure thereof varies from a predetermined range. In this regard, the present invention substantially fulfills this need.

SUMMARY OF THE INVENTION

In view of the foregoing disadvantages inherent in the known types of water control devices of various designs and configurations now present in the prior art, the present invention provides an improved electronic water utility safety apparatus. As such, the general purpose of the present invention, which will be described subsequently in greater detail, is to provide a new and improved electronic water utility safety apparatus and method which has all the advantages of the prior art and none of the disadvantages.

To attain this, the present invention essentially comprises a new and improved electronic water utility safety system, comprising, in combination, a control box for the system positionable within the house of a user. A light emitting diode display is provided to indicate a sensed water pressure. A buzzer is mounted in the box to generate an audible signal upon the pressure being identified outside of an acceptable range. A first electrical line runs from the central box to a source of potential within the house. A second electrical line runs from the central box to a water line for the house. A sensor is mounted on the second line to determine the pressure within the water line and to allow the indicator to display such determined pressure. A valve is located within the water line adjacent to the sensor to shut off the flow of water upon the pressure being outside of the acceptable range. An electrical circuit is provided for controlling the box.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved electronic water utility safety apparatus which has all the advantages of the prior art water control devices of various designs and configurations and none of the disadvantages.

It is another object of the present invention to provide a new and improved electronic water utility safety apparatus which may be easily and efficiently manufactured and marketed.

It is a further object of the present invention to provide a new and improved electronic water utility safety apparatus which is of a durable and reliable construction.

An even further object of the present invention is to provide a new and improved electronic water utility safety apparatus which is susceptible of a low cost of manufacture with regard to both materials and labor, and which accordingly is then susceptible of low prices of sale to the consuming public, thereby making such water control devices of various designs and configurations economically available to the buying public.

Still yet another object of the present invention is to provide a new and improved electronic water utility safety apparatus which provides in the apparatuses and methods of the prior art some of the advantages thereof, while simultaneously overcoming some of the disadvantages normally associated therewith.

Still another object of the present invention is to terminate the water feed to a house when the pressure thereof varies from a predetermined range.

Lastly, it is an object of the present invention to provide a new and improved electronic water utility safety apparatus comprising a control box positionable within the house of a user. A display indicates a sensed water pressure. An indicator is mounted in the box to generate an audible signal upon the pressure being modified from an acceptable range. An electrical line is positioned from the box to a source of potential within the house. A second line is positioned from the box to a water line for the house. A sensor is mounted on the line to determine the pressure within the line and to allow the indicator to display such pressure read. A valve is located within the water line adjacent to the sensor to shut off the flow of water upon the pressure being outside of a predetermined range. An electrical circuit is provided for controlling the box.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
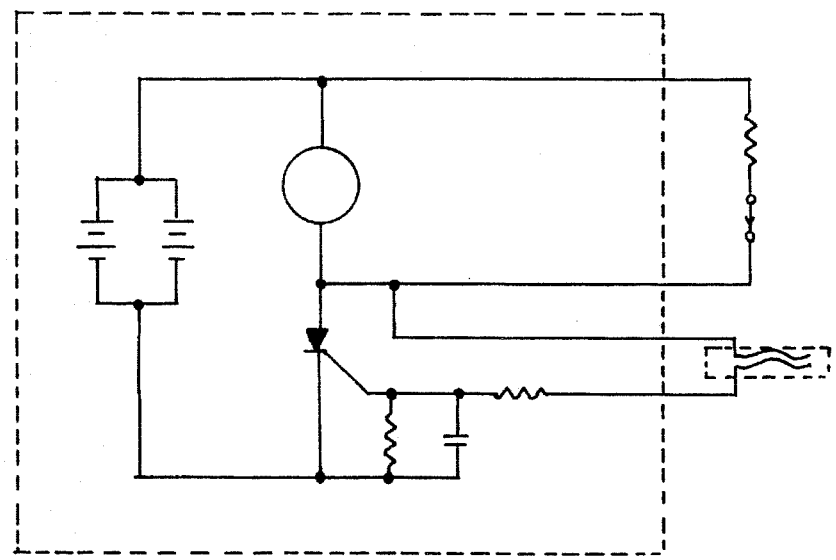
FIGS. 1 and 2 are schematic illustrations of electrical water utility safety devices constructed in accordance with prior art designs.
Figure 2:
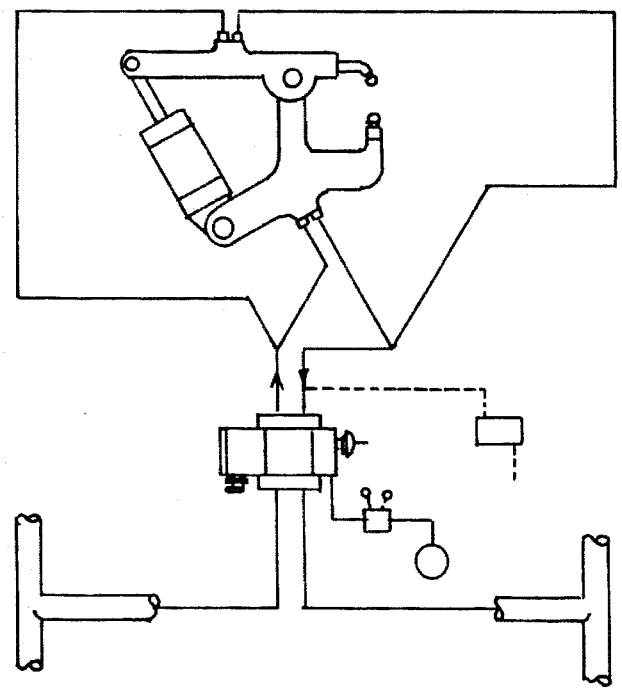
Figure 3:
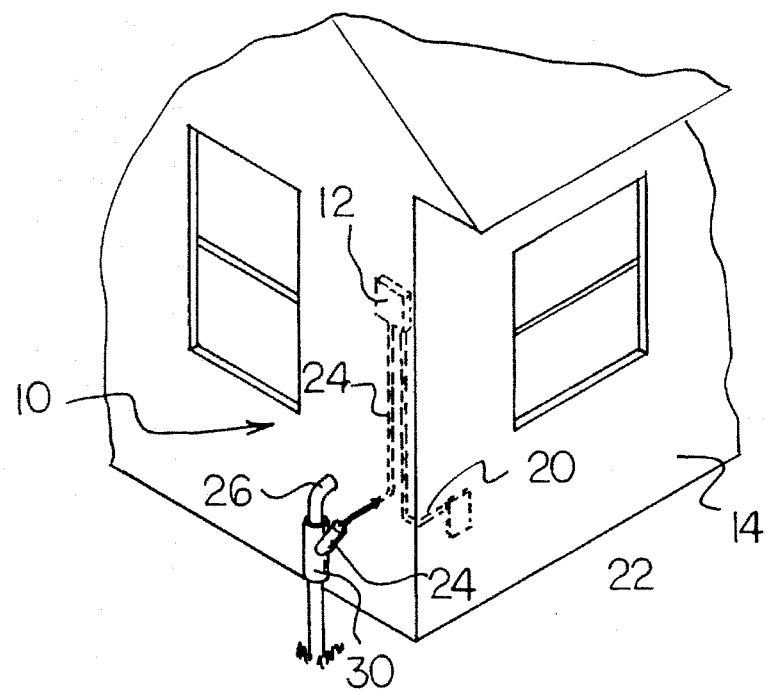
FIG. 3 is a perspective illustration of the exterior of a house equipped with the preferred embodiment of the electronic water utility safety apparatus constructed in accordance with the principles of the present invention.
Figure 4:
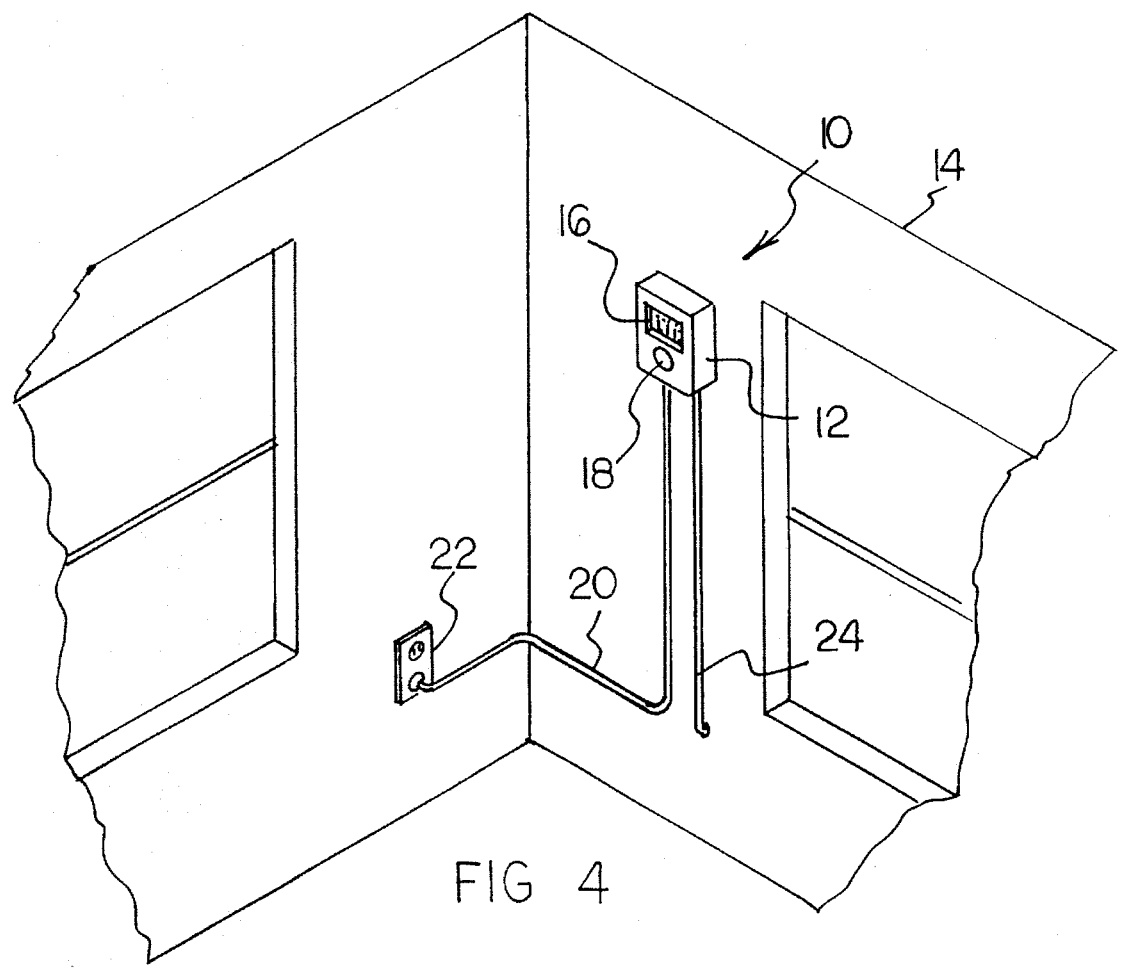
FIG. 4 is a perspective view of the apparatus shown in FIG. 3, but taken from interior of the house.
Figure 5:
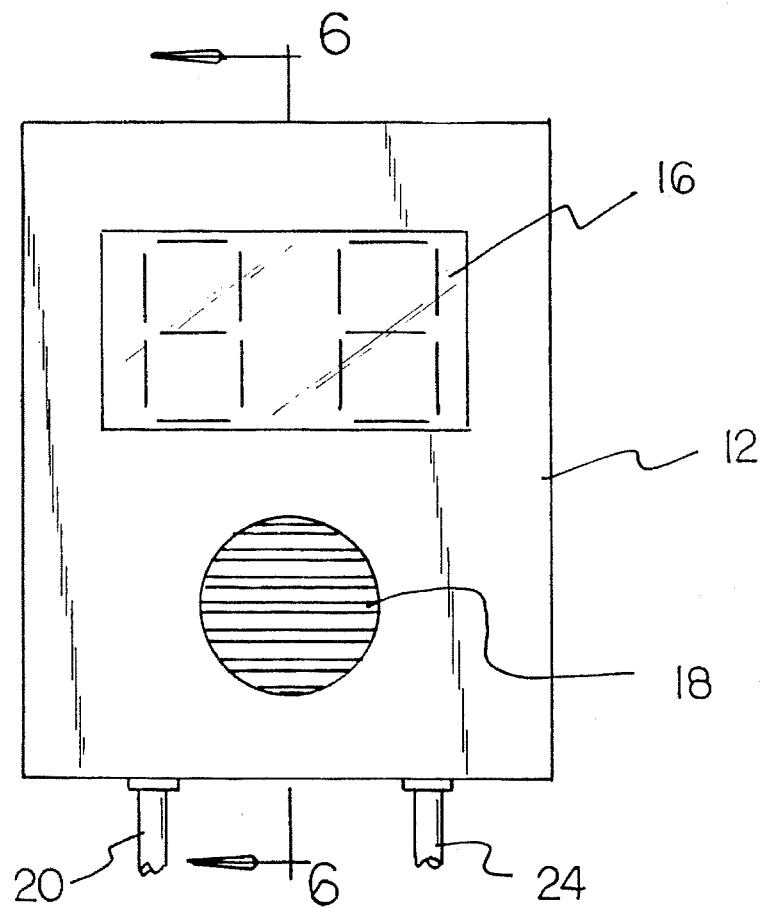
FIG. 5 is a front elevational view of the control box shown in FIG. 4.
Figure 6:
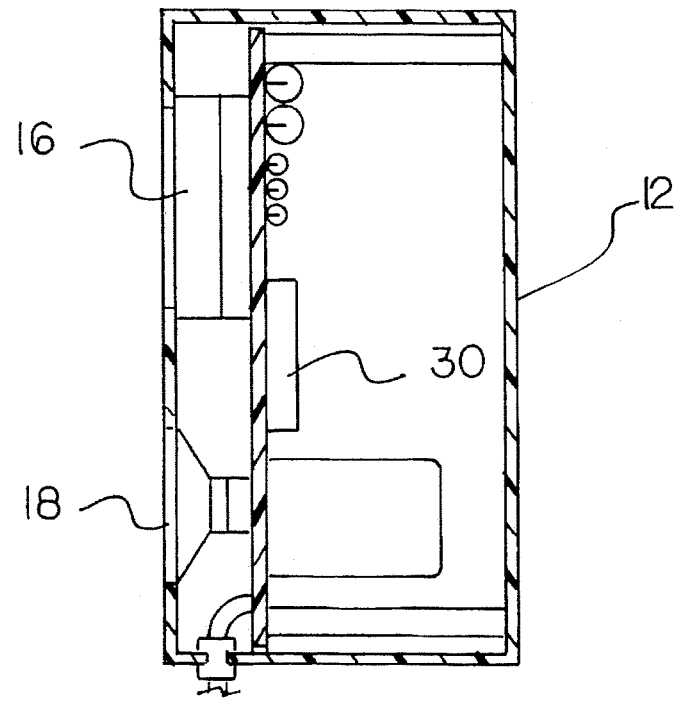
FIG. 6 is a cross sectional view taken along line 6—6 of FIG. 5.
Figure 7:
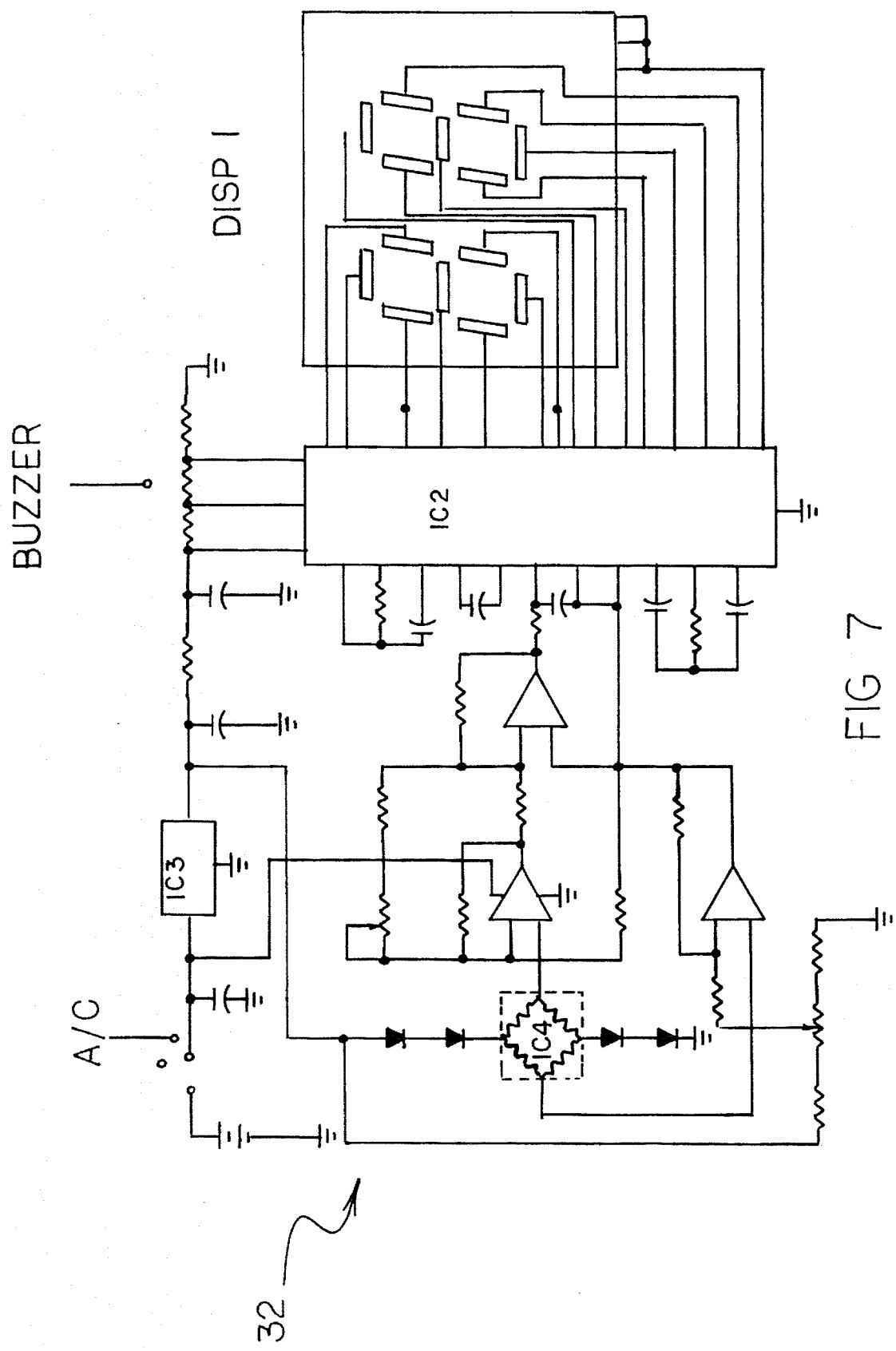
FIG. 7 is an electrical schematic of the control apparatus employed in the device of the prior Figures.

With reference now to the drawings, and in particular to FIG. 1 thereof, a new and improved electronic water utility safety apparatus embodying the principles and concepts of the present invention and generally designated by the reference numeral 10 will be described.

The present invention, the new and improved electronic water utility safety apparatus, is comprised of a plurality of components. Such components in their broadest context include a control box, a light emitting diode, a buzzer, a first electrical line, a second electrical line, a sensor, a valve and an electrical circuit. Such components are individually configured and correlated with respect to each other so as to attain the desired objective.

More specifically, the central component of the system 10 is the control box 12. Such control box is for operating the system in an intended manner. It is preferably positioned within the house 14 of the user. In this manner, it may be monitored at a most convenient location.

Located within the control box is a light emitting diode 16. Other visible displays are acceptable. The function of the light emitting diode display is to indicate a sensed water pressure.

Also located on the control box is a buzzer 18. The buzzer is mounted in the control box. It functions to generate an audible signal in the event that the pressure is identified in a water line outside of the house which is identified as being outside of an acceptable range of pressure.

Extending downwardly from the control box is a first electrical line 20. Such electrical line extends from the control box to a source of potential 22. Such source of potential is preferably located within the house.

Next provided is a second electrical line 24 on the bottom of the control box 12. Such second electrical line extends from the control box to the water line 26 being sensed for changes and pressure.

In association with the second electrical line 24 and the water line 26 is a sensor 28. Such sensor is mounted on the second electrical line at the water line. The function is to determine the pressure within the water line. This is to then allow the light emitting diode display to disclose to someone viewing the control box what the determined pressure is as determined by the sensor. Also located in the water line adjacent to the sensor is a valve 30. Such valve is located within the water line adjacent to the sensor. Its function is to shut off the flow of water upon the pressure being outside of the acceptable range. Consequently, when the pressure is outside of the range as determined by the sensor and displayed by the light emitting diode display, an electrical circuit within the box will control the functions of the box and switch the orientation of the valve 30 to shut off all flow of water due to an unacceptable situation arising from the pressure within the water line.

An apparatus which can be installed in the main water service pipe to monitor and display water pressure and discontinue flow if an emergency requires. It is comprised of a solenoid actuated valve and a pressure sensor control unit. The valve is mounted directly within the pipe in the same fashion as the existing main control valve in the system. The control unit features a digital display and houses the pressure sensing components. It is wired to the solenoid but can be remotely mounted near an entry/exit to the building or dwelling. The entire system is powered by standard AC house current at 110 to 120 volts.

The pressure within the pipe is constantly monitored by, and displayed on, the control unit. Should the pressure fluctuate beyond predetermined limits, the solenoid will be energized, and the valve will close. Hence, if the system developed a leak, a pressure drop will occur, and flow will be discontinued. Inversely, a higher than normal pressure will shut off water flow. Both of these events will occur with the control unit set top the automatic mode. It can also be controlled manually from the keyboard without the need for any special techniques. The idea is simple but very effective. The building, and all of the articles therein, will be effectively protected against water damage whether or not anyone is present. This system will be especially valuable to those who find it necessary to be away temporarily, such as on vacation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved electronic water utility safety system, comprising, in combination:

a control box for the system positionable within the house of a user;

a digital light emitting diode display to indicate a numerical value indicative of a sensed water pressure;

a buzzer mounted in the box to generate an audible signal upon the pressure being identified outside of an acceptable range;

a first electrical line from the central box to a source of potential within the house;

a second electrical line from the central box to a water line for the house;

a sensor mounted on the second line to determine the pressure within the water line and to allow the display to indicate such determined pressure;

a valve actuated via a solenoid, the valued located within the water line and mounted thereto adjacent to the sensor in a fashion similar to that of an existing main control valve, the value adapted to shut off the flow of water automatically upon the pressure being outside of the acceptable range the value further adapted to shut off the flow of water manually from the control box at the discretion of a user upon the inspection of the display; and an electrical circuit for controlling the box.

\* \* \* \* \*